United States Patent
Heide et al.

(10) Patent No.: US 10,619,665 B2
(45) Date of Patent: Apr. 14, 2020

(54) FASTENING ELEMENT FOR CONNECTING TRANSMISSION MEANS TO A LEVER ELEMENT

(71) Applicant: Kiekert Aktiengesellschaft, Heiligenhaus (DE)

(72) Inventors: Thomas Heide, Essen (DE); Armin Kleinmann, Haigerloch (DE); Martin Lindmayer, Sulz am Neckar (DE)

(73) Assignee: Kiekert Aktiengesellschaft, Heiligenhaus (DE)

( * ) Notice: Subject to any disclaimer, the term of this patent is extended or adjusted under 35 U.S.C. 154(b) by 0 days.

(21) Appl. No.: 16/242,096

(22) Filed: Jan. 8, 2019

(65) Prior Publication Data

US 2019/0136904 A1    May 9, 2019

Related U.S. Application Data

(63) Continuation of application No. 14/890,629, filed as application No. PCT/DE2014/000201 on Apr. 17, 2014, now abandoned.

(30) Foreign Application Priority Data

May 10, 2013  (DE) ........................ 10 2013 208 652

(51) Int. Cl.
  *F16C 1/10*  (2006.01)
  *E05B 79/20*  (2014.01)
  *E05B 79/16*  (2014.01)

(52) U.S. Cl.
  CPC .............. *F16C 1/102* (2013.01); *E05B 79/16* (2013.01); *E05B 79/20* (2013.01); *F16C 1/105* (2013.01);
(Continued)

(58) Field of Classification Search
  CPC ......... Y10T 403/7005; Y10T 403/7007; Y10T 403/32557; Y10T 403/32549; F16B 21/02;
(Continued)

(56) References Cited

U.S. PATENT DOCUMENTS 4,656,880 A    4/1987 Hildebrand et al.
6,209,827 B1   4/2001 Kawai
(Continued)

FOREIGN PATENT DOCUMENTS

DE    19546469 C1    1/1997
DE    19607084 A1    8/1999
(Continued)

OTHER PUBLICATIONS

Machine Translation of DE102010015058A1 by Lexis Nexis Total Patent on Dec. 10, 2015.
(Continued)

*Primary Examiner* — Jonathan P Masinick
(74) *Attorney, Agent, or Firm* — Woodard, Emhardt, Henry, Reeves & Wagner, LLP

(57) ABSTRACT

The invention relates to fastening elements for connecting transmission means such as tie rods, Bowden cables or the like to lever elements, in particular for motor vehicle locks, and to connecting arrangements equipped with such fastening elements. In order to allow reliable mounting and a structurally simple manufacture of the fastening elements, the fastening element is provided with a bayonet contour in such a manner that the fastening element, when mounted, is hinged to the lever element so as to be swiveled about a swivel axis. Owing to the swivelability and secure fastening to the lever element, the fastening element is particularly suitable for use in an actuation-force transmission chain
(Continued)

between a motor vehicle lock and an actuating element for actuating said motor vehicle lock.

20 Claims, 2 Drawing Sheets

(52) U.S. Cl.
CPC ...... *F16C 2226/72* (2013.01); *F16C 2350/52* (2013.01)

(58) Field of Classification Search
CPC .......... F16B 21/04; E05B 79/16; E05B 79/20; F16C 1/102; F16C 1/105
See application file for complete search history.

(56) References Cited

U.S. PATENT DOCUMENTS

| | | | |
|---|---|---|---|
| 7,189,112 | B2 | 3/2007 | Hamaguchi |
| 7,303,800 | B2 | 12/2007 | Rogers |
| 8,221,041 | B2 | 7/2012 | Hauser |
| 8,544,236 | B2 | 10/2013 | Benedetti et al. |
| 9,239,070 | B2 | 1/2016 | Wiffen |
| 9,267,525 | B2 | 2/2016 | Everard |
| 2007/0001452 | A1 | 1/2007 | Friel |
| 2013/0287486 | A1 | 10/2013 | Tseng |

FOREIGN PATENT DOCUMENTS

| | | |
|---|---|---|
| DE | 19961824 A1 | 7/2000 |
| DE | 20 2007 013 152 U1 | 2/2008 |
| DE | 10 2006 056 971 A1 | 6/2008 |
| DE | 20 2009 004 359 U1 | 7/2009 |
| DE | 102010015058 A1 | 10/2011 |
| DE | 10 2011 002 850 A1 | 7/2012 |
| EP | 0183019 A1 | 6/1986 |

OTHER PUBLICATIONS

Machine Translation of DE19546469C1 by Lexis Nexis Total Patent on Dec. 10, 2015.
Machine Translation of DE19807084A1 by Lexis Nexis Total Patent on Dec. 10, 2015.
Machine Translation of DE19961824A1 by Lexis Nexis Total Patent on Dec. 10, 2015.
German Office Action received in related DE102013208652.0 dated May 23, 2013.
Machine translation of DE102006056971A1 by Patbase on Jan. 28, 2020 (pp. 46).
Machine translation of DE102011002860A1 by Patbase on Jan. 28, 2020 (pp. 38).
Machine translation of DE202007013152U1 by Patbase on Jan. 28, 2020 (pp. 18).
Machine translation of DE202009004359U1 by Patbase on Jan. 28, 2020 (pp. 51).

FASTENING ELEMENT FOR CONNECTING TRANSMISSION MEANS TO A LEVER ELEMENT

CROSS-REFERENCE TO RELATED APPLICATIONS

This application claims the benefit of U.S. patent application Ser. No. 14/890,629 filed Jan. 5, 2016, which is a national stage of PCT/DE2014/000201 filed Apr. 17, 2014, which claims priority to German Patent Application No. DE 10 2013 208 652.0 filed May 10, 2013, which are all hereby incorporated by reference.

BACKGROUND

The invention relates to a fixing element to connect transmission media such as pull rods, Bowden cables or similar to a lever element in accordance with the generic term of claim 1 and a connection configuration with such a fixing element, especially for motor vehicle latches.

Fixing elements of the stated type can be utilized in different areas of a vehicle. In the present case, the focus is in particular on use within the scope of an activation force effect chain between a vehicle latch and an activation element for activation of the motor vehicle latch. The closing device can, for example, involve doors, sliding doors, trunk lids, hoods or similar of a motor vehicle.

It is known to design locking elements for a connection rod between an activation and/or a locking device and an activation and/or locking element with a clip element. The basic construction of such a configuration is shown in DE 10 2010 015 058 A1. The clip element comprises two components and is safeguarded from being levered out by its subcomponents. The subcomponents connected via a common crosspiece can be moved longitudinally to the connection rod and are designed in such a way that a sub element can be applied to an end piece of the connection rod.

Indeed, the locking element permits performance of the required functionality in relation to securing of a connection rod from automatic loosening. However, the dual-component construction of the clip element is not satisfactory from a constructional or manufacturing viewpoint. Furthermore, construction with separate sub elements impedes installation, which subsequently can lead to problems in the required functionality of the mounted locking element.

SUMMARY

The invention is based on the task of improving and continuing to form a connection configuration, namely in particular in that the aforementioned disadvantages can be rectified with simple constructional means.

The task is resolved by a fixing element in accordance with claim 1 and a connection configuration in accordance with the additional claim. Advantageous further formations and designs arise from the sub claims.

The consideration of envisaging a bayonet contour on the fixing element is crucial. Consequently, in the mounted state—therefore in the state connected in the opening of the lever element—the fixing element is pivotably diverted around a swiveling axis on the lever element. The bayonet contour initially enables a simple-to-produce mechanical connection of the fixing element in the opening of the lever element. The bayonet contour is preferably designed in such a way that the fixing element can be connected with the lever element by insertion and rotation in the opening thereof.

It is furthermore interesting in the proposed solution that the fixing element can be pivotably diverted around a swiveling axis on the lever element. The connection of a transmission medium such as a pull rod, a Bowden cable or similar can, for example, be safely achieved on the fixing element designed as a connector without the risk of the connection being automatically loosened or damaged due to dynamic stresses.

Furthermore, the proposed solution enables retention of the fixing element mounted in the opening of the lever element without separate securing elements needing to be envisaged. The mounting of separate securing elements can be dispensed with in this regard and erroneous mountings can be reliably prevented.

In a preferred execution form of the invention, the fixing element demonstrates one or several radial projections in relation to the swiveling axis of the fixing element. In connection with the opening of the lever element, these provide a simple-to-produce and/or loosenable connection in the nature of a bayonet joint. Preferably at least two projections should be envisaged on opposite sides of the fixing element in order to enable a stable connection between the fixing element and the lever element.

In an especially preferential design, the fixing element demonstrates a peg-shaped area stretching parallel to its swiveling axis. Alternatively or additionally, the fixing element has a bar-shaped area running vertically to its swiveling axis which preferably comes into contact with the lever element in the mounted state of the fixing element. The peg-shaped area running parallel to the swiveling axis forms a constructively stable execution of the fixing element. The peg-shaped area is preferably designed as a socket inside in order to simply provide a connection option for a transmission medium such as a pull rod, a Bowden cable or similar. With the bar-shaped area running vertically to the swiveling axis a further stabilization of the fixing element can be achieved, in particular in the mounted state in connection with the lever element coming into contact.

In an even more preferential design, an extension stretching principally parallel to the swiveling axis on the bar-shaped area is envisaged which, in particular in the mounted state of the fixing element, is or can be pivotably adjacent to an outside contour of the lever element. Thus, it is particularly easy to execute safe control and stabilization of the fixing element on the connected lever element.

The extension can also usefully feature an edge on the side turned towards the external contour of the lever element. 'Edge' means that the extension demonstrates a protruding section on the side turned towards the external contour which is principally edge-shaped. The edge can also be rounded and/or flattened accordingly. Accordingly, targeted and improved control and stabilization of the fixing element on the outside contour of the lever element is attained.

Alternatively or additionally, the extension can also be principally pin-shaped. It is possible for the pin-shaped extension to be round, quadratic or also flattened when viewed from the profile. The lengthwise aspect of the extension then preferably runs parallel to the swiveling axis of the fixing element.

The purpose of the pin-shaped extension is for the improved support and stabilization of the fixing element to the lever element. Consequently, in particular the mounting works which are generally associated with long cycle times, such as the insertion and, if necessary, the loosening of transmission media such as push rods can be executed with particular simplicity.

As a further design feature, the bar-shaped area is longer on the side of the extension in relation to the swiveling axis of the fixing element. A recess of the bar-shaped area is preferably envisaged on this side. This enables a weight reduction and constructional bracing of the fixing element.

The peg-shaped area can usefully also demonstrate radial projections of different dimensions. Preferably, then, the larger projection is positioned on the side of the extension in relation to the swiveling axis of the fixing element. Thus, the bayonet contour can be deployed in an especially stable and secure manner in the opening of the lever element by the radial projections in conjunction with the bar-shaped area safely encompassing the relevant section of the opening of the lever element.

In the preferred design, the fixing element, especially the bar-shaped area, if necessary with the connecting extension, is designed at least in places with resilient malleability. The fixing element is preferably made of plastic. The resilient malleability of the fixing element, in particular of the bar-shaped area and, if necessary, the extension enable connection with the opening of the lever element in a spring clamp manner. Thus, a self-locking connection can be achieved between the fixing element and the opening of the lever element. The configuration is preferably made in such a way that the extension of the bar-shaped area is deflected and then locks into place when rotating the fixing element in the opening of the lever element.

According to a further aspect of the invention, a connection configuration is claimed as such with a fixing element in accordance with the proposal. Reference may be made to all versions which are suitable for describing the connection configuration.

In order to enable relevant connection of the fixing element with the lever element, the opening of the lever element can expediently demonstrate at least a radial recess in relation to its dimensions which is designed in particular corresponding to the projection of the fixing element. If, for example, several projections are envisaged on the fixing element, several relevant recesses can be envisaged on the opening of the lever element in order to enable a simple connection by insertion and rotation in the manner of a bayonet joint.

It is particularly advantageous, adjacent to the opening of the lever element, to envisage an external contour for the interaction with the fixing element and, if necessary, the extension of the bar-shaped area. The external contour is especially advantageous, meaning that a pre-determined swiveling area is envisaged for the fixing element. Thus, a pivotability of the fixing element can be targetedly adjusted and improved stable control of the fixing element can be achieved. Consequently, in particular a self-activated or unintentional loosening of the fixing element is prevented. The external contour can usefully demonstrate an end stop which, for example, prevents further pivoting of the fixing element on one side of the external contour. Alternatively or additionally, a limitation section can be usefully envisaged, whereby the limitation section is executed as a radial raised area in relation to the swiveling axis of the fixing element. Preferably the limitation section is executed in such a way that the fixing element can only be controlled via the limitation section with resilient malleability. Thus, the fixing element can be connected to the external contour in a self-locking manner and at the same time attain a pre-determined swiveling area of the fixing element.

Hereinafter, the invention is explained in further detail on the basis of sketches which are only an execution example: The sketches show:

DETAILED DESCRIPTION OF THE DRAWINGS

Figure 2:
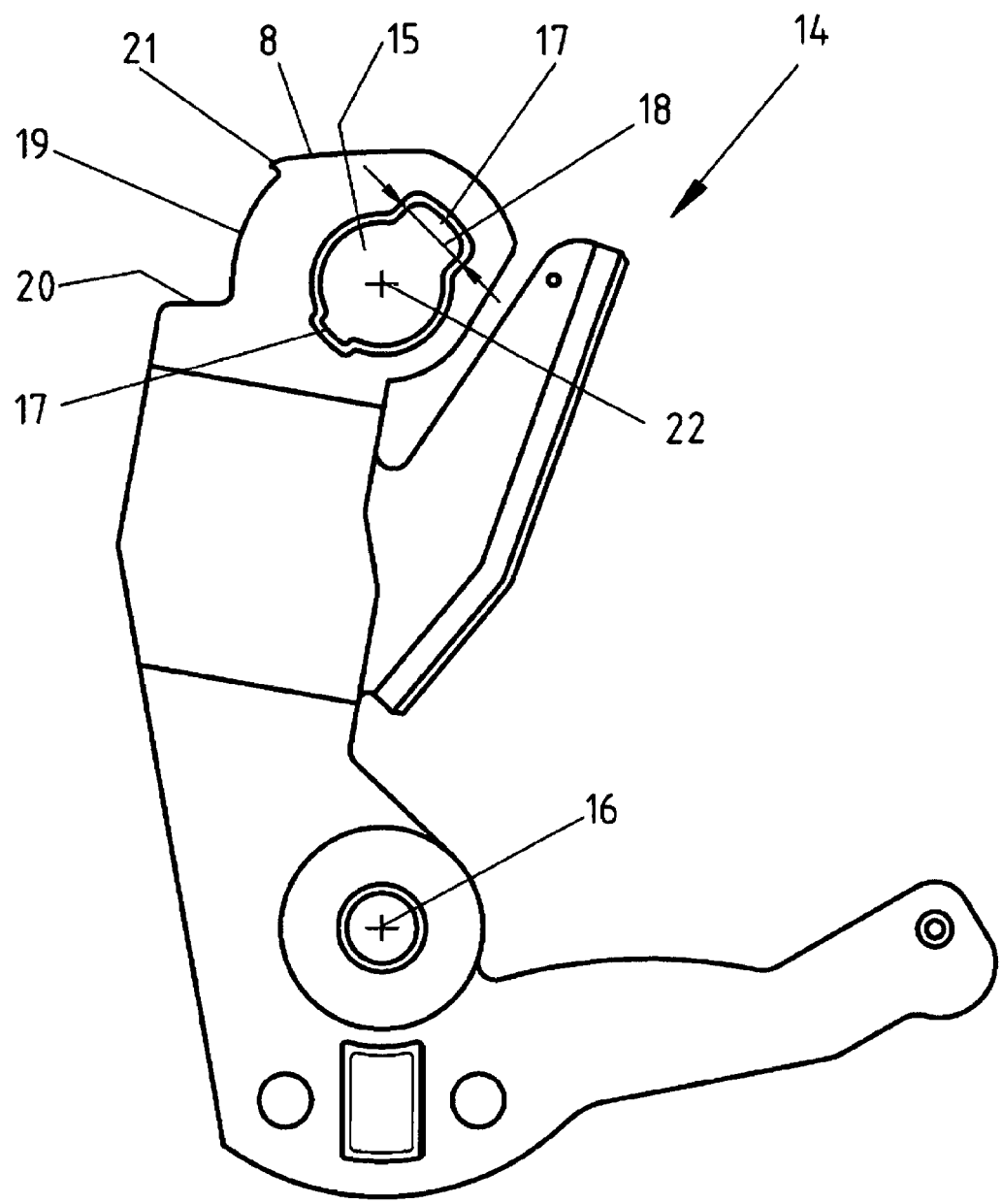

It must be pointed out that the proposed fixing element and the connection configuration are applicable in all conceivable areas of a motor vehicle in which transmission media such as pull rods, Bowden cables or similar are to be connected to relevant lever elements 14 within the scope of a force effect activation chain. However, in an especially preferential design the proposed fixing element 1 or the connection configuration can be applied within the scope of a force effect activation chain between a motor vehicle latch and an activation element for activation of the motor vehicle latch. FIG. 2 relates to an internal locking lever designed here for a motor vehicle latch accordingly.

The fixing element 1 in question is equipped with a peg-shaped area 3 and a bar-shaped area 2 as shown in FIGS. 1 *a* to 1 *c*. The peg-shaped area 3 is inserted into the opening 15 of the lever element during connection with a lever element. The bar-shaped area 2 is pivotably adjacent to one side of the lever element 14 in the mounted state in order to attain stable control. The bar-shaped area 2 has an internal recess 23.

It is now crucial that the fixing element 1 has a bayonet contour in such a way that the fixing element in the mounted state is pivotably diverted around the swiveling axis 22 on the lever element. The peg-shaped area 3 mainly runs parallel to the swiveling axis 22 and is preferably designed as a socket 7 towards the center in order to enable a simple connection of a transmission medium such as a pull rod. The bar-shaped area 2 mainly extends vertically to the swiveling axis 22.

Figure 1A:
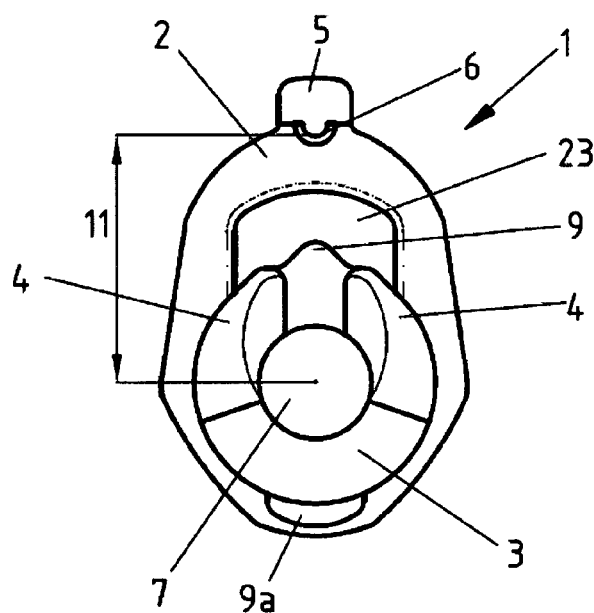
FIG. 1*a* a front view of a fixing element,
FIG. 1*b* a sectional view (A-A) of the fixing element,
FIG. 1*c* a top view on the fixing element and
FIG. 2 a diagrammatic view of a lever element.

As visible in FIG. 1*a*, the peg-shaped area 2 can furthermore demonstrate projecting stops 4 which provide improved connection of a transmission element and, if necessary, restricted contortion.

Figure 1B:
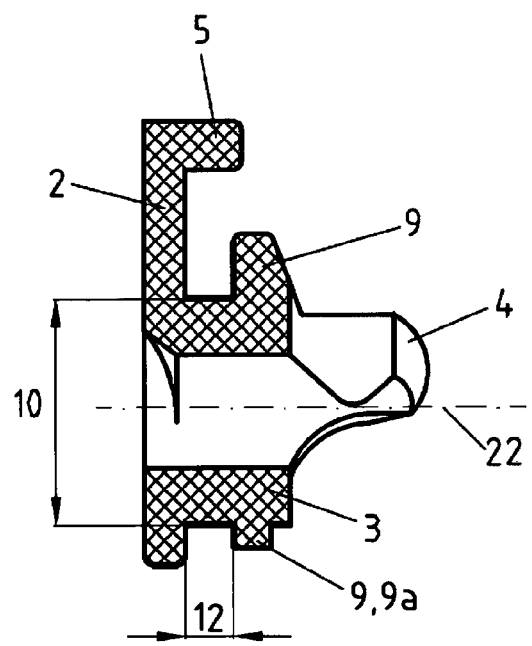

FIG. 1*b* shows a sectional view (A-A) and illustrates the projections 9 which protrude radially on the swiveling axis 22 which can also be formed as a protruding nose 9*a*. In conjunction with the peg-shaped area 3 and the bar-shaped area 2 a pivotable connection with the lever element 14 can be achieved in the manner of the bayonet joint. The connection is basically attained by insertion of the fixing element 1 into the opening 15 of the lever element and subsequent rotation of the fixing element 1.

Figure 1C:
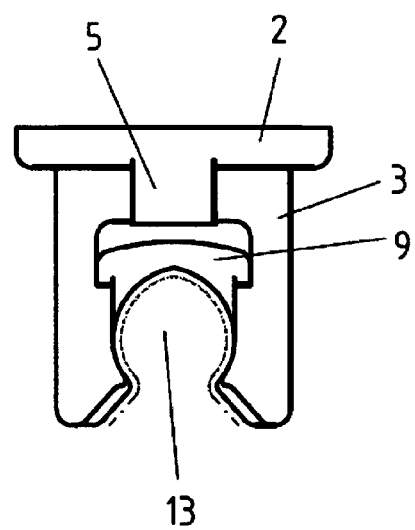

In the execution examples depicted in FIG. 1*a* to FIG. 1*c* an extension 5 running parallel to the swiveling axis 22 of the bar-shaped area 2 is envisaged. This extension 5 can be designed as a pin-shaped flattened extension 5 as illustrated and stretch, for example, in relation to the course of the swiveling axis 22 up to the height of the radial projection 9 and 9*a*. The distance of the projection 9 or nose 9*a* to the bar-shaped area 2 is then preferably between 1.5 to 2 mm. In the mounted state, the extension 5 of the bar-shaped area 2 is adjacent to an external contour 19 of the lever element in order to enable improved control of the fixing element 1 on the lever element 14. Accordingly, the bar-shaped area 2 in relation to the swiveling axis 22 is longer on the side of the extension 5 and preferably demonstrates a recess 23 towards the center. Details on the external contour 19 of the lever element 14 are clarified below.

The radial projections 9 and 9a are of different dimensions here, whereby the larger projection 9 is configured on the side of the extension 5 in relation to the swiveling axis 22. The projection designed as a nose 9a is then configured on the opposite side of the peg-shaped area 3.

The peg-shaped area 3 of the fixing element, for example, has an external diameter 10 of 5 to 11 mm. Towards the swiveling axis 22 the peg-shaped area 3 is preferably designed as a socket 7 in order to facilitate simple connection of a transmission medium. The diameter of the socket 7 is between 3 and 5 mm, for example. The fixing element 1 is preferably manufactured from a single piece of plastic. The bar-shaped area 2 and the connected extension 5 are at least in part executed in a resiliently malleable manner in order to enable resilient deflection of the extension 5 for a connection in the manner of a spring clamp. The extension 5 also has an edge 6 here on the side facing the external contour 19 of the lever element 14. The edge 6 is preferably aligned in the direction of the swiveling axis 22. The edge 6 can basically also be designed with a rounded or flattened protruding edge in order to attain safe control of the fixing element 1 on the external contour 19 of the lever element. The distance 11 of the edge 6 to the pivoting axis 22 of the fixing element 1 is, for example, selected between 6 and 11 mm.

FIG. 1c shows a top view of the fixing element. Viewed from the side of the extension 5 the peg-shaped area 3 is preferably designed in such a way here that a principally circular orifice which is open on one side 13 is formed vertically to the swiveling axis 22. The passage 13 can be used, for example, as a connection for a transmission medium such as a pulling rod. The passage 13 can then be designed in such a way that a transmission medium can be accommodated by resilient malleability.

FIG. 2 shows the lever element 14 which is mounted pivotally around a lever axis 16 for activation. The lever element 14 is equipped with an opening 15 configured excentrically to the lever axis 16 for the insertion or channeling out of activation movements. The purpose of the opening 15 is to accommodate the fixing element 1, in order to attain a pivotable connection of a transmission medium such as a push rod, a Bowden cable or similar on the lever element 14. Radial recesses 17 are envisaged on the opening 15 in relation to the swiveling axis 22, which are preferably configured on opposite sides of the opening 15. The recesses 17 are dimensioned in particular to enable the insertion of the fixing element 1 of the peg-shaped area 3 in addition to radial projections 9 and 9a. Due to subsequent rotation of the fixing element 1 a pivotable connection is provided between the fixing element 1 and the lever element 14. The circular area of the opening 15 preferably has a diameter of between 6 and 11 mm. Two recesses 17 of different dimensions are preferably envisaged on the opening 15. The larger recess 17 then, for example, has a breadth 18 of 5 to 7 mm viewed via the circumference of the opening 15. Incorrect mounting of the fixing element 1 to the lever element 14 can be prevented with the recesses 17 of different dimensions.

It is preferably the case that an external contour 19 is envisaged adjacent to the opening 15 of the lever element 14. In the mounted state, this enables the interaction with the extension 5 of the fixing element 1 for pivotability in a pre-determined swiveling area. The external contour 19 is in particular designed in such a way that an end stop 20 is envisaged on one side, which safely limits the swiveling area of the fixing element 1, and additionally on the other side of the external contour 19 a limitation section 21 is present which is designed as a radial raised area in relation to the swiveling axis 22 of the fixing element. Preferably the limitation section 21 is designed in such a way that the fixing element 1 can only be controlled via the limitation section 21 in a resiliently malleable manner. Preferably, the limitation section 21 is executed with a steeper angle than on the deflection section 8 leading to the external contour 19 on the side of the external contour 19. The deflection section 8 is in particular designed in such a way that the radial distance to the swiveling axis 28 constantly increases to the limitation section 21. The external contour 19 on the side of the limitation section 21 preferably demonstrates a comparatively steeper angle in order to reliably prevent a self-activated loosening of the fixing element 1. The resiliently malleable extension 5 of the fixing element 1 thus enables simple and safe mounting of the fixing element 1 to the lever element. Consequently, a loosening of the fixing element 1 is guaranteed and at the same time incorrect mountings and associated defects of the connection configuration are prevented. The external contour 19 is preferably configured with a radius between 8 and 9 mm to the swiveling axis 22. The circular arc formed by the external contour 19 then encompasses in particular an angle of 40 to 50°.

For the depicted and, to this extent, preferred execution examples the fixing element 1 and the lever element 14 are designed in one piece. The fixing element 1 or the lever element 14 can be produced at negligible manufacturing expense. The lever element 14 preferably has a density of 1 to 2 mm.

REFERENCE SIGNS

1 Fixing element
2 bar-shaped area
3 peg-shaped area
4 Stop
5 Extension
6 Edge
7 Socket
8 Deflection section
9 Projection
9a Nose
10 External diameter of the peg-shaped area
11 Distance of the edge to the swiveling axis
12 Distance of the bar-shaped area to the projection
13 Passage
14 Lever element
15 Opening of the lever element
16 Lever axis
17 Recess
18 Breadth of the recess
19 External contour
20 End stop
21 Limitation section of the external contour
22 Swiveling axis of the fixing element
23 Recess

We claim:

1. A fixing element to connect transmission media to a lever element for motor vehicle latches, wherein the lever element defines an opening, an external contour that is spaced apart from the opening and a limitation section that is adjacent the external contour, whereby the fixing element defines a socket that is adapted to receive and connect either a pull rod or a Bowden cable to the fixing element, whereby the fixing element can be connected to the opening of the lever element, the fixing element comprising:

a bayonet contour adapted to be inserted through the opening, wherein the fixing element is pivotably deflected around a swiveling axis to mount the fixing element to the lever element defining a mounted state, a radial projection extending away from the swiveling axis which is adapted to come into contact with the lever element in the mounted state, a bar-shaped area extending away from the swiveling axis which is adapted to come into contact with the lever element in the mounted state, an extension extended principally in parallel to the swiveling axis from the bar-shaped area which is adjacent to the external contour of the lever element in the mounted state, wherein pivotably deflecting the fixing element around the swiveling axis moves the extension along the external contour to the limitation section wherein the extension is deflected over the limitation section with resilient malleability.

2. The fixing element in accordance with claim 1, wherein the fixing element comprises a peg-shaped area running parallel to its swiveling axis.

3. The fixing element in accordance with claim 1, wherein the extension is pin-shaped.

4. The fixing element in accordance with claim 2, wherein the peg-shaped area comprises radial projections of different dimensions such that a larger projection is configured on the side of the extension in relation to the swiveling axis of the fixing element.

5. A connection configuration for connecting a transmission medium to a lever element, for a motor vehicle latch with a fixing element in accordance with claim 1 and a pivotable lever element, wherein the fixing element can be attached for the insertion or channeling out of activation movements in an opening positioned eccentrically to a lever axis of the lever element, and wherein the fixing element is accommodated in the opening of the lever element in the manner of a bayonet joint; consequently, the fixing element is pivotably connected to the lever element.

6. The connection configuration according to claim 5, wherein the opening of the lever element comprises a radial recess which corresponds to a projection of the fixing element.

7. The connection configuration according to claim 5, wherein the lever element adjacent to the opening defines an external contour for the interaction with the fixing element as an extension of the fixing element providing a predetermined swiveling area for the fixing element.

8. The connection configuration in accordance with claim 5, wherein an external contour of the lever element comprises an end stop for the pivoting of the fixing element.

9. The connection configuration in accordance with claim 5, whereby the limitation section is a radial raised area in relation to a swivel axis of the fixing element, such that the fixing element can be led only with resilient malleability over the limitation section.

10. The fixing element in accordance with claim 1, wherein, in the mounted state, the lever element is positioned between the radial projection and the bar-shaped area.

11. The fixing element in accordance with claim 1, wherein the bayonet contour comprises a solid nose.

12. The fixing element in accordance with claim 11, wherein the solid nose of the bayonet contour defines a spherical contoured surface.

13. A system for connecting transmission element for motor vehicle latches, the system comprising:
   a lever element that defines an opening, wherein the lever element comprises an external contour and a limitation section that are each spaced apart from the opening;
   a transmission media selected from the group consisting of: pull rods and Bowden cables;
   a fixing element that is adapted to receive and connect to the transmission media, wherein the fixing element defines a swiveling axis, wherein the fixing element comprises:
      a bayonet contour configured to be inserted through the opening;
      a radial projection that extends away from the swiveling axis;
      a bar-shaped area that extends away from the swiveling axis and is spaced apart from the radial projection, wherein the bar-shaped area contacts the lever element when the bayonet contour is inserted through the opening;
      an extension extending away from the bar-shaped area principally in parallel to the swiveling axis, wherein the extension is spaced apart from the swiveling axis and wherein the extension is adjacent to the external contour when the bayonet contour is inserted through the opening;
   wherein, after the bayonet contour is inserted through the opening, pivoting the fixing element about the swiveling axis moves the extension along the external contour to the limitation section and results in the extension deflecting over the limitation section with resilient malleability.

14. The system according to claim 13, wherein a radial distance between the opening and the external contour increases toward the limitation section.

15. The system according to claim 13, wherein the limitation section is configured to resist releasing the extension once the extension is deflected over the limitation section with resilient malleability.

16. The system according to claim 13, wherein the fixing element defines a socket that is adapted to receive and connect to the transmission media.

17. The system according to claim 13, wherein the opening of the lever element defines a radial recess which corresponds to the radial projection of the fixing element.

18. The system according to claim 13, wherein, after the bayonet contour is inserted through the opening and pivoted about the swiveling axis, a portion the lever element is positioned between the radial projection and the bar-shaped area.

19. The system according to claim 13, wherein the bayonet contour comprises a solid nose.

20. The system according to claim 19, wherein the solid nose of the bayonet contour defines a spherical contoured surface.

* * * * *